Patented Mar. 2, 1948

2,436,919

UNITED STATES PATENT OFFICE 2,436,919

FLY SPRAYS COMPRISING AN N-ALKYL-PHTHALIMIDE AND DDT

Samuel I. Gertler and Herbert L. J. Haller, Washington, D. C., assignors to the United States of America, as represented by the Secretary of Agriculture No Drawing. Application October 9, 1944,
Serial No. 557,917

3 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticidal spray compositions which are particularly useful in combating flies, gnats, mosquitoes, and similar insects.

Extracts of insecticidal plant products, such as pyrethrum flowers, derris, cube, barbasco, timbo, and the like, are widely used for the control of insects pests of the type mentioned above. Such toxic agents are generally employed in a solvent, such as a mineral oil fraction like refined kerosene, naphtha, and so forth. Sprays containing pyrethrins have been found very useful due to their quick paralyzing or knockdown action on flies and the like. However, they are generally used in low concentrations because of the high cost, and in such concentrations the percentage kill is relatively low compared to the percentage knockdown. Extracts of rotenone-containing plants, such as derris, cube, and the like, give a higher kill over a much longer period of time, but lack a knockdown action.

The object of this invention is the provision of economical insecticidal spray compositions which will have a high percentage of both knockdown and kill.

The above object is accomplished by preparing a composition composed of a stable, substantially odorless and colorless knockdown agent which in itself has little or no insecticidal value against the insects to be combated but which has a high knockdown action, together with an insecticidal toxic agent showing high kill over an extended period of time but no appreciable knockdown. Such compositions, containing as essential active ingredients a knockdown agent and an insecticidal toxic agent, have been found to be highly effective insecticidal compositions against flying insects.

We have discovered that N-butylphthalimide and N-amylphthalimide may be used in accordance with this invention. These compounds have an unusually high knockdown effect, but little or no toxicity to houseflies.

They have been found to be compatible with known insecticides, and when combined therewith, produce insecticidal compositions of high knockdown action and high kill.

The following Examples III and IV are illustrative of compositions of this invention, while Examples I and II illustrate the value of N-butylphthalimide and N-amylphthalimide as knockdown agents:

Example I

A 5% solution of N-butylphthalimide in refined kerosene gave a 94% knockdown of houseflies in 10 minutes with a resultant negligible kill of 1% in 24 hours.

Example II

A 5% solution of N-amylphthalimide in refined kerosene gave an 80% knockdown of houseflies in 10 minutes with a resultant negligible kill of 4% in 24 hours.

Example III

A refined kerosene solution comprising 5% of N-butylphthalimide as a knockdown agent, and 1 milligram per milliliter of 2,2-bis(p-chlorophenyl)-1,1,1-trichloroethane as a toxic agent, produced a fly spray which gave a knockdown substantially equivalent to high grade commercial pyrethrum sprays and, in addition, a far higher kill.

Example IV

A refined kerosene extract of derris or cube root comprising 5% of N-amylphthalimide as a knockdown agent produced a fly spray which gave a knockdown substantially equivalent to high grade commercial pyrethrum sprays and, in addition, a far higher kill.

It has been found that roots which are practically free of rotenone but contain rotenoids can also be used instead of plant materials containing rotenone. By "rotenoids" are meant substances other than rotenone but structurally related to it, naturally occurring in leguminous fish-poison plants, e. g., derris, Lonchocarpus, Mundulea, and Tephrosia (R. C. Roark, Journal of Economic Entomology, volume 33, page 416 (1940)). This gives a more economical product since either low grade roots, or roots from which most of the rotenone has been removed, can be employed.

It is to be understood that other toxic agents may be used which give a high kill, but possess little or no knockdown value. Also, the proportions of the ingredients may be varied so as to produce a well balanced fly spray.

The advantage of compositions of this invention is that the paralyzing action of the knockdown agent probably weakens the insects and thereby renders them easier to kill. Accordingly, weaker toxic agents, or smaller percentages of stronger toxic agents, may be employed than could be employed without the knockdown agent.

Having thus described our invention, we claim:

1. A fly spray comprising a member selected from the group consisting of N-butylphthalimide and N-amylphthalimide as its essential knockdown agent and 2,2-bis(p-chlorophenyl)-1,1,1-trichloroethane as its essential active insecticidal ingredient, incorporated in a mineral oil carrier.

2. A fly spray comprising N-butylphthalimide as its essential knockdown agent and 2,2-bis(p-chlorophenyl)-1,1,1-tricholoroethane as its essential active insecticidal ingredient, incorporated in a mineral oil carrier.

3. A method of destroying flying insects comprising contacting said insects with a composition containing a member selected from the group consisting of N-butylphthalimide and N-amylphthalimide as its essential knockdown agent and 2,2-bis(p-chlorophenyl)-1,1,1-trichloroethane as its essential active insecticidal ingredient.

SAMUEL I. GERTLER.
HERBERT L. J. HALLER.

REFERENCES CITED

The following references are of record in the file of this patent:

UNITED STATES PATENTS

| Number | Name | Date |
| --- | --- | --- |
| 1,957,429 | Adam | May 8, 1934 |
| 2,329,074 | Muller | Sept. 7, 1943 |
| 2,389,427 | Gertler | Nov. 20, 1945 |

OTHER REFERENCES

Dictionary of Organic Compounds, by Heilbron, 1938 ed., vol. 3, page 477.

Bushland, Jr. Econ. Entom., vol. 33, 1940, page 674.

Roark, Jr. Econ. Entom., vol. 34, Oct. 1941, pages 684–691.